Nov. 13, 1962 HIROYE MURAMATSU 3,064,085

ABSENCE SIGN DEVICE FOR TELEPHONE

Filed Nov. 21, 1958 2 Sheets-Sheet 1

INVENTOR
HIROYE MURAMATSU
BY George B. Oujevolk
ATTORNEY

INVENTOR
HIROYE MURAMATSU
BY
George B. Oujevolk
ATTORNEY

United States Patent Office 3,064,085
Patented Nov. 13, 1962

3,064,085

ABSENCE SIGN DEVICE FOR TELEPHONE

Hiroye Muramatsu, 504 Kamikomatsu-cho, Katsushika-ku, Tokyo, Japan

Filed Nov. 21, 1958, Ser. No. 775,485
1 Claim. (Cl. 179—89)

This invention relates to an absence signal or sign device for telephones to let the party making a call know of the absence of the other party.

When a call is made by telephone and there is no answer from the other end of the line and the telephone keeps ringing, much time is wasted uselessly. This inconvenience greatly lowers business efficiency.

It has now been discovered that an absence signal or sign device can be provided to overcome this difficulty.

The invention a well as its advantages will become more apparent from the following description and the accompanying drawings in which.

Figure 1:
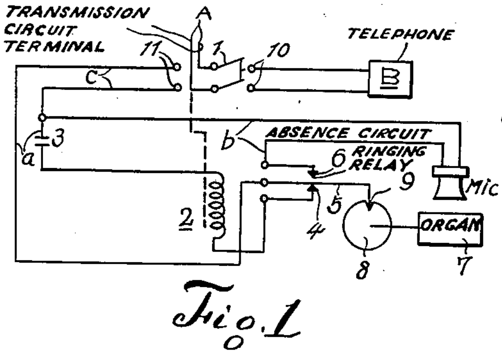
FIG. 1 is a schematic circuit diagram wherein an organ or musical device is used to provide an absence sign or signal.
Figure 2:
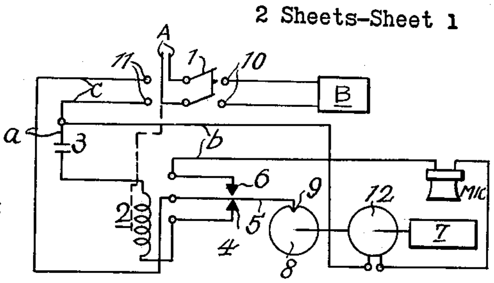
FIG. 2 is a schematic circuit diagram showing a variation of the arrangement shown in FIG. 1.

As shown in FIG. 1, a transmission circuit terminal A is adapted and designed to be switched or connected to telephone apparatus B, and the absence signal or sign circuit C by means of a change-over switch 1. Said circuit consists of a call sign circuit *a* and an absence sign circuit *b* and is formed by a relay 2, a contact point 4 and an operating lever 5 of the relay connected in series when the relay 2 is not actuated and when the relay 2 is actuated it is formed by a microphone M*ic*, a contact point 6 and an operating lever 5 connected in series. The curved free end of the operating lever is stopped by the concave part 9 on the outer circumference of a disc 8 directly connected to the shaft of organ 7 moved by a mechanical motive power when the relay is not actuated so as to prevent turning of the organ 7.

While people are present, the changeover switch 1 is connected to terminal 10 and when there are no people present, the change-over switch is connected to terminal 11. In case of an incoming telephone call, the call sign current will flow from the terminal 11 to the condenser 3, then to the relay 2 the contact point 4, the operating lever 5 and finally it will flow in the circuit *b* actuating the relay 2. The free terminal of the operating lever 5 will be moved upward so that the stop is released from the disc 8 and the concave part 9. Then the organ 7 will start playing. At the same time, the operating lever coming in touch with contact point 6, circuit *b* will be closed and thus the organ sound will be transmitted to the speaker by the microphone M*ic* through the terminal 11. When the disc makes one turn and the free terminal of the operating lever 5 and stops at concave part 9, contact between lever 5 and point 6 is released. Point 6 comes in contact with point 4 and transmission of the absence indicating signal terminates.

Figure 3:
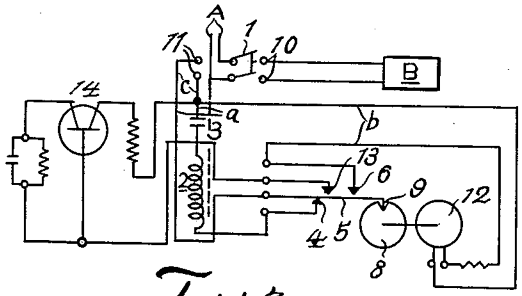
FIG. 3 is a schematic circuit diagram wherein a tape recorder provides the absence sign or signal.
Figure 4:
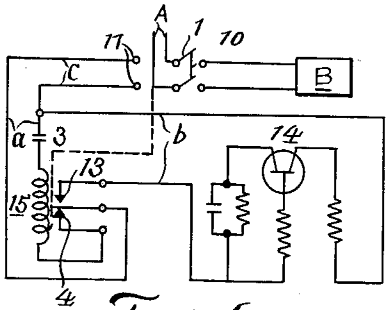
FIG. 4 is a schematic circuit diagram showing a variation of the arrangement illustrated in FIG. 3.
Figure 5:
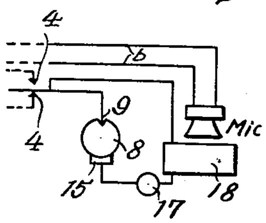
FIG. 5 is another schematic circuit diagram wherein a tape recorder is used for the absence sign.

As mentioned above, in order to transmit the absence sign at the moment when the call sign current breaks off, a small size motor 12 which turns the organ 7 may be connected in series with the microphone connected with the absence sign circuit *b*. Moreover, it is not necessarily limited to an organ, any other sound wave generating device can also be selected. In the example shown in FIG. 3, it is not an organ, but an oscillator provided with a transistor. In this example, the terminal 11 is provided with a contact point 13 for transmitting the wave produced by the oscillator 14 and the disc 8 is rotated by means of a small size motor 12 and at the same time an oscillating wave is transmitted to the speaker by means of the oscillator 14 with transistor. Moreover, in FIG. 4, the disc 8 is replaced by an oil-relay 15. In this example, reciprocation of the relay after starting is performed by said oil-relay by means of a time adjusting method and for the period necessary for this reciprocation, the oscillator is made to transmit waves by means of the oscillator 14. As mentioned above, it is desirable when this device is used in an office, to actuate a tape-recorder giving the address or whereabouts of the proprietor. Thus, as shown in FIG. 4, on the circumference of the disc 8, an electro-motor and a tape-recorder 18 are connected between contactmaker 16 keeping in contact with disc 8 so that a message on tape recorder 18 is transmitted through the microphone M*ic* when the relay 2 is actuated.

Figure 6:
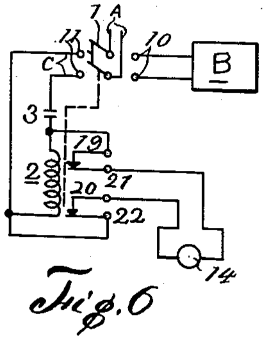
FIG. 6 is a schematic circuit diagram showing an absence signal arrangement without shutting off the call sign circuit.
Figure 7:
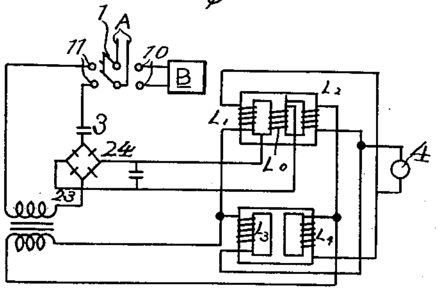
FIG. 7 is a schematic circuit diagram similar to FIG. 6 wherein a bridge circuit is used.
Figure 8:
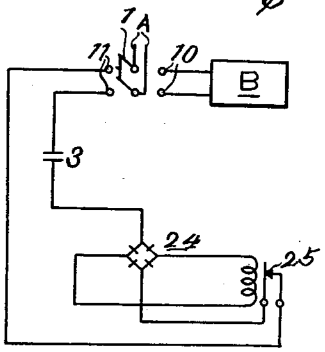
FIG. 8 is a schematic circuit diagram similar to FIG. 6 wherein a high speed contact breaker is used.

Examples shown in FIGS. 6 to 8 are a little different from preceding ones in that the call sign circuit is not opened by the arrival of the call sign but the absence sign circuit is formed by said call sign. The example shown in FIG. 6 depicts the change-over connection by means of a change-over switch but the terminal 11 of the absence sign generating circuit *c* is connected in series with the field coil of the relay 2 provided with a condenser 3 and contact points 19 and 20. Between the terminals of said field coil both ends 21 and 22 of the absence sign generator 14 are connected by means of the contact points 19 and 20. Hence, when the office is closed the change-over switch is turned to said terminal, in the same way as before and as the call sign from A flows in the circuit *c*, the relay 2 will be actuated and the terminals 21 and 22 will come in touch with the contact points 19 and 20 and waves from the absence sign generator 14 will be superimposed on the call sign and transmitted to the speaker through the terminal 11. When the speaker hangs up the apparatus, the contact of points 21 and 22 of the relay 2 being broken, the machine is ready for the next call sign. Another example shown in FIG. 7 is the one wherein a bridge circuit is formed by means of inductances $L_1$, $L_2$, $L_3$ and $L_4$ between the absence sign generator 14 and the transformer 23. Balance of the bridge is broken when the call sign current flows in the inductance $L_0$ connected by means of a condenser 3 and the rectifier 24 and the absence sign wave emanated from the absence sign generator 14 is transmitted from the terminal 11 through the transformer 23. Furthermore, when a high speed interruptor 25 is connected by means of the rectifier 24, said interruptor will be actuated by the call sign current and intermittent waves will ensue. Said waves and that of call sign are superimposed together and transmitted to the speaker. This circuit prevents actuation of the time measure circuit, hence it needs no other special circuit to prevent said time measure circuit as compared with the ones shown in FIGS. 1 to 5.

Figure 9:
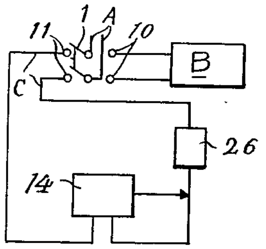
FIG. 9 is a block diagram of the electrical system contemplated herein.
Figure 10:
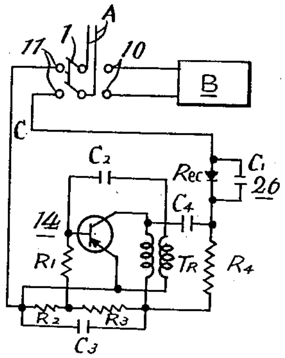
FIG. 10 shows a schematic diagram of the embodiment of FIG. 9.
Figure 11:
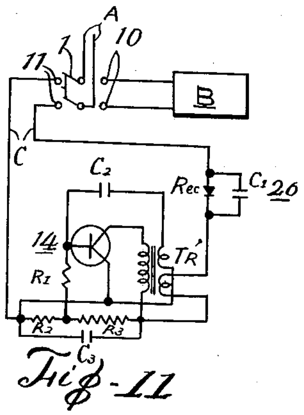
FIG. 11 shows a schematic diagram of a variation of the embodiment of FIG. 10.
Figure 12:
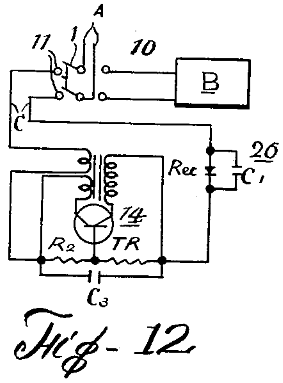
FIG. 12 shows a schematic diagram of another variation of the embodiment of FIG. 10.
Figure 13:
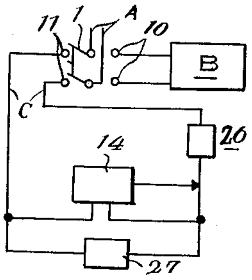
FIG. 13 is a block diagram of a variation of the electrical system herein contemplated.
Figure 14:
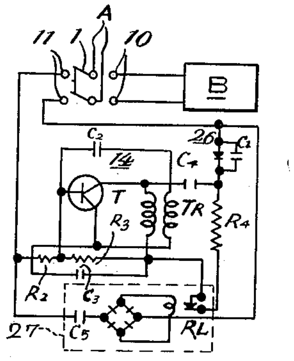
FIG. 14 is a schematic circuit diagram of an embodiment of FIG. 13.
Figure 15:
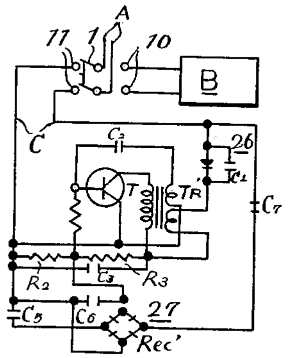
FIG. 15 is another schematic circuit diagram similar to FIG. 14.

On the other hand, examples shown in FIGS. 9 to 12 illustrate the use of polarity reversal but the change-over connection by means of a change-over switch 1 shown in electric system diagram of FIG. 9 is the same as described above. The absence sign generating circuit fitted to a terminal 11 is provided with the absence sign generator 14 and the keying circuit 26 and for said sign generator 14, an electron tube or a transistor system is used and for the keying circuit 26, an electron tube or a dry rectifier, etc. is used. FIG. 10 is a connection diagram as an embodiment of the example shown in FIG. 9, wherein a half-wave rectifier R*ec* is used for keying circuit 26 and a transistor T, resistances $R_1$, $R_2$ and $R_3$ and condensers $C_1$, $C_3$ and $C_4$ and a transformer T*r* are connected together as indispensable elements. When the change-over switch is turned to the terminal side 11 and when there is no call sign, the direct current being stopped by means of the keying circuit 26, no current will flow in the absence sign generator 14. Hence, said generator 14 will not be actuated. However when there is a call sign, the reversed polarity caused by the call sign current, will actuate the keying circuit 26 and the absence sign generator 14 likewise. As shown in FIG. 10, due to reversed polarity, the current flows in the half-wave rectifier R*ec* and electric pressure on both ends of the resistances $R_2$ and $R_3$ will go down and the transistor T of the absence sign generator 14 will be actuated and begin oscillation. This oscillation wave is transmitted to the speaker through the condenser $C_4$. Moreover, another example shown in FIG. 11 is not the resistance $R_4$ connection, but the transformer connection and is provided with a transformer T*r'*. FIG. 12 is an example wherein reversed polarity is utilized. However, an oscillation controlling circuit 27 is connected and by this means, the absence sign generator will actuate on the phase only where the intermittent call sign stops, so that call sign wave and absence sign wave may be transmitted alternately. As shown in FIG. 14, condenser $C_5$, rectifier R*ec'*, and interruptor RL are connected together as an oscillation controlling circuit. While the call sign current is flowing, the relay RL will actuate and output circuit of the oscillator T will be closed. When call sign current is shut off, the relay RL will return to its original position and the output circuit of said T is closed so that it enables transmission of oscillation wave. Thus, call sign and absence sign can be transmitted alternately. FIG. 15 is another example of FIG. 14 wherein the relay RL is not used and the call sign current is rectified by means of the rectifier R*ec'*. The electric pressure thus obtained is given on to the oscillator T in order to obtain the same object as in aforementioned description.

Figure 16:
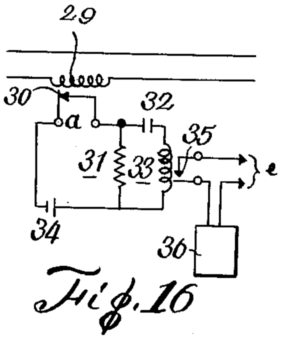
FIG. 16 is a schematic diagram of the attachment of the device to the telephone exchange apparatus.
Figure 17:
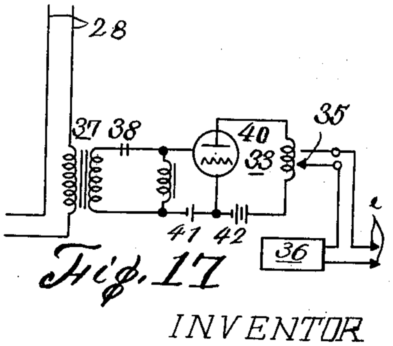
FIG. 17 is a schematic diagram of the attachment of the device to the telephone exchange apparatus at higher frequencies than the arrangement of FIG. 16; and, FIG. 18 is a schematic diagram of still another arrangement for the attachment of the device to the telephone exchange apparatus.
Figure 18:
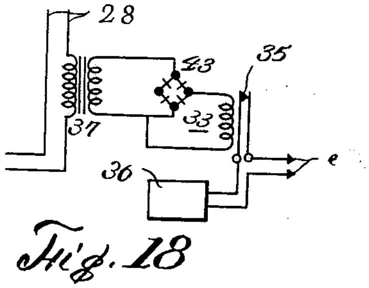

The foregoing relates to a device attached to a telephone apparatus of the subscriber. This device is preferably made as simple as possible and may be attached to exchange apparatus. The system of relating said device with the one attached to a telephone apparatus is useful according to location and expenses. FIGS. 16 to 18 relate to practical examples of this last embodiment. FIG. 16 illustrates the case when the circuit shown in FIG. 8 is attached to a telephone apparatus. When the intermittent signal transmitted by the call sign wave comes to the exchange office, the relay 29 will be connected with the sign circuit 28. The terminal of circuit *a* which is opened or shut by means of the contact point 30 of relay 29, will be connected respectively with the resistance 31, condenser 32, relay 33 and D.C. electromotor 34. The contact point of the relay 33 is connected with the absence sign transmitting circuit *e* by means of the oscillator 36. Therefore, while call sign current is flowing in the sign circuit 28, the relay 29 will be actuated and the circuit *d* will be closed by means of contact point 30. But, because of condenser 32, D.-C. current will not flow and relay 33 will not be actuated. When the intermittent current comes to relay 29 from the side of the person called, circuit *a* being closed by contact 30, current will flow in circuit *a* and through the contact point of the relay 33 and actuate the oscillator 36 so that the absence sign oscillating signal is transmitted to the absence sign transmission circuit *e* to notify the caller about the absence of the person he is calling. The circuit shown in FIG. 17 is the one which is suited when the frequency of the wave generated in FIG. 8 is high and the sign circuit is connected with a transformer 37 provided with a primary side acting as a low frequency wave choke and at the same time an amplifying circuit is formed by means of a condenser 38, a choke coil 39, a vacuum tube 40, A battery 41, and B battery 42 connected with the relay 33 provided with a contact point 35 on its output side. As for the oscillators 36 and *e*, they are almost the same as the above. When, the transformer is not actuated by a normal call sign, no output is produced on the secondary side. However, at the arrival of a high frequency signal, voltage is induced in the secondary of the transformer and flows to the vacuum tube grid. The plate current then flows. This plate current is normally biased by means of A and B batteries to prevent its flowing. The flowing of the plate current will actuate the relay 33 and the absence sign wave will be transmitted to the speaker through the contact point 35 in the same way as before. FIG. 18 shows an example when the output of the transformer 37 is great and it is rectified directly by means of the rectifier 43 and made to actuate the relay 33.

As explained in the foregoing description, according to the present invention, a simple device is attached on the subscriber's side or both on the subscriber's and the exchange office side and by means of which when a telephone subscriber wishes to call the other subscriber with whom he wants to talk and if the latter is absent, he is immediately told about that without wasting much time. The consumption of the telephone and exchange apparatus and their accessories being small, utilization of the communication circuit will be much improved.

The present invention may be embodied in other specific forms without departing from the spirit thereof. It is therefore desired that the present embodiments be considered in all respects as illustrative and not restrictive, reference being had to the appended claim rather than to foregoing description to indicate the scope of the invention.

What is claimed is:

In a telephone communications system wherein calls are put to a certain station; a device at said station to give a signal when no person at the station will respond to an incoming call, said device comprising, in combination; an oscillator circuit to give a signal; a bias line from said oscillator; resistances on both sides of said bias line, so biasing said oscillator as to prevent the giving of said signal; a half wave rectifier, in series with said resistances to reverse the polarity of the current flow through said resistances and cut out said bias when current flows through said half wave rectifier, starting said oscillation; a condenser through which said oscillating wave is fed; and, a change over switch to switch said device onto the incoming call terminal; whereby upon switching of said change over switch onto said incoming call terminal, the bias exerted by said resistance prevents the operation of said oscillator, but upon an incoming call arriving, the current given by the half wave rectifier nullifies the bias and the oscillator will give off a signal which is fed to said telephone through said condenser.

References Cited in the file of this patent

UNITED STATES PATENTS 435,893 Hatch ---------------- Sept. 2, 1890

2,057,898 Kruse ---------------- Oct. 20, 1936

2,252,327 Lovett ---------------- Aug. 12, 1941

2,724,016 Van Deventer ---------- Nov. 15, 1955

FOREIGN PATENTS 1,046,536 France ---------------- July 8, 1953